Aug. 22, 1961  F. J. MARGIDA  2,996,885
DISPLACEMENT TYPE BRAKE SAFETY VALVE
Filed July 31, 1959  2 Sheets-Sheet 1
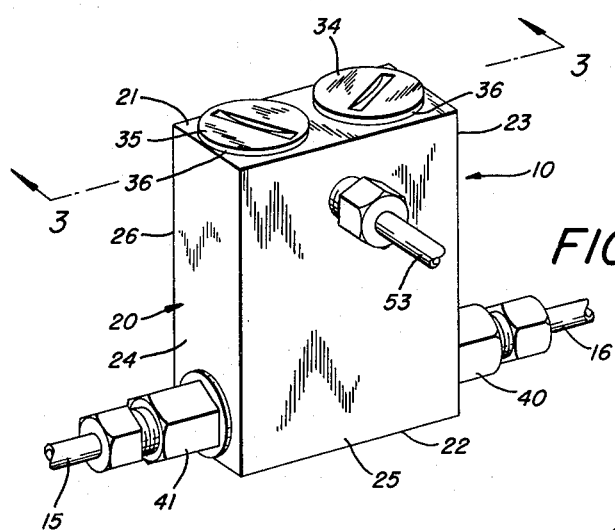
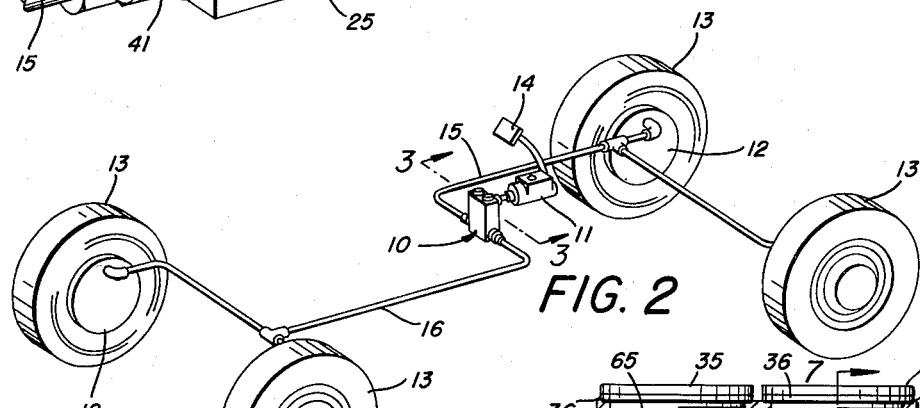
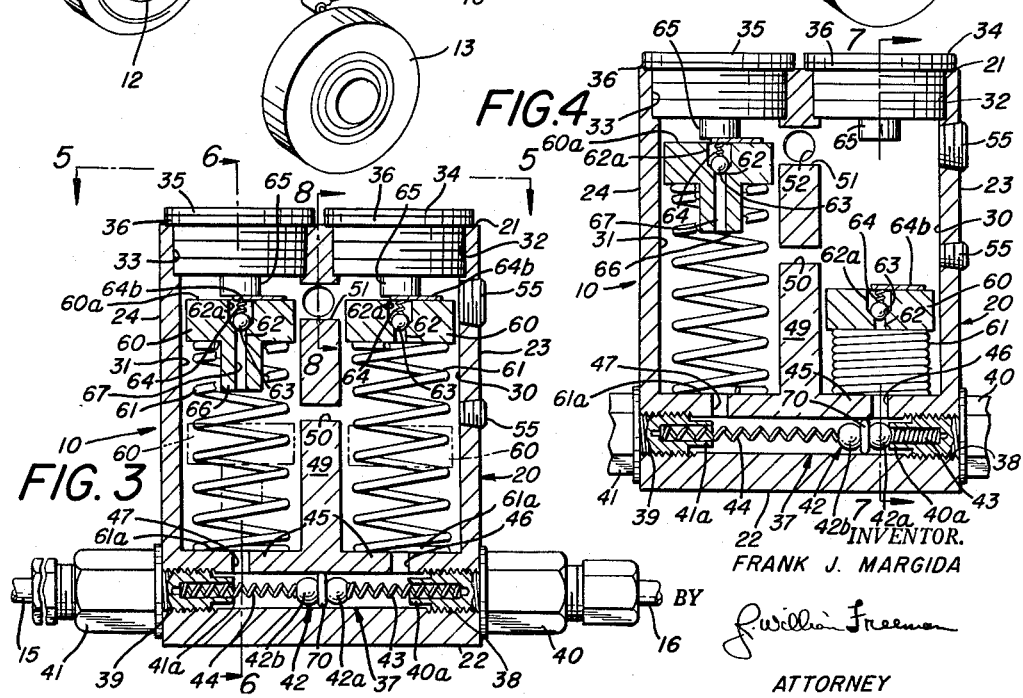
INVENTOR.
FRANK J. MARGIDA
BY
*William Freeman*
ATTORNEY Aug. 22, 1961     F. J. MARGIDA     2,996,885
DISPLACEMENT TYPE BRAKE SAFETY VALVE
Filed July 31, 1959     2 Sheets-Sheet 2

INVENTOR.
FRANK J. MARGIDA
BY
*William Freeman*
ATTORNEY

United States Patent Office 2,996,885
Patented Aug. 22, 1961

2,996,885
DISPLACEMENT TYPE BRAKE
SAFETY VALVE
Frank J. Margida, 518 Grove Ave., Cuyahoga Falls, Ohio
Filed July 31, 1959, Ser. No. 830,774
13 Claims. (Cl. 60—54.5)

This invention relates to hydraulic brake control systems and in particular has reference to an improved type of safety mechanism for use with such hydraulic brake systems in automobiles.

As is believed well known, the operation of a hydraulic brake system is predicated upon the application of hydraulic fluid under pressure to the brake drum mechanism, with this pressurized fluid serving to actuate the brake drum mechanism and accordingly cause a braking action to occur.

It is believed further well known that such systems normally comprise a master cylinder together with fluid lines that lead respectively to the front and rear wheels of an automobile, with one line normally serving the front wheels while the other line will serve the brakes that are provided on the rear wheels of the automobile.

In the past, it has been found that rupture of one of these lines will serve to render the automobile brakes completely inoperative due to the fact that the pressurized fluid in the system will evacuate through the break therein, with the result that there will be a complete loss of braking pressure. Thus, in the normal instance, failure of any portion of the braking line results in a complete failure of the device in view of the fact that the usual hydraulic brake system does not contemplate any type of check valve system between the front and rear braking systems of the car.

In applicant's prior application, Serial No. 633,245, filed January 9, 1957, and now U.S. Patent 2,902,043, there was disclosed an improved type of safety device that eliminated all of the above mentioned disadvantages. Specifically, the subject matter of the above application disclosed a device wherein separate and independent supply reservoirs were provided for the front and rear systems of the automobile brake system, with the action of each such system being predicted on the operation of the line associated therewith, with failure of either front or rear supply line not affecting, in any way, the operation of the remaining supply line.

While the above device has been satisfactory in commercial use, it has been found that even further improved results can be obtained by modifying the above structure to relieve the back pressure that exists in the dual chambers of the device, with such relieving of back pressure serving to permit use of a lighter centering springs in connection with the normally centered shut-off valve, with the result that a more sensitive type of valve can be obtained.

It has been further found that if the dual chambers are connected at more than one point, that there can be a constant equalization of applied pressures for a predetermined period of time, with the result that while the dual piston will travel downward in uniformity to a certain point, the same will thereafter operate independently of each other for the purpose of controlling the supply in either of the lines that are involved.

It has even further been discovered that improved operation can be achieved by limiting the approach of the acuating piston with respect to the top of the cylinder within which the same moves, so that a more uniform application of downward pressure can be applied to the top surface of the piston member for the purpose of providing more positive action during braking.

Still further, it has been found that the sealing piston that is employed to seal off the line upon brake failure can be improved by providing the same with a sealing disc that serves to prevent leakage around the piston member which has been found to sometimes interfere with the closing function of the same.

Production of an improved safety device having the above advantages accordingly becomes the principal object of this invention, with other objects of the invention becoming more apparent upon a reading of the following brief specification, considered and interpreted in the light of the accompanying drawings.

Of the drawings:

FIGURE 1 is a perspective view of the improved device.

FIGURE 2 is a schematic, perspective view showing the improved device installed in conjunction with the hydraulic brake system of an automobile.

FIGURE 3 is a vertical section taken through the improved safety device and illustrating the position of the component parts in normal condition and illustrating the position of the component parts in full and chain-dotted line positions during normal operating conditions.

FIGURE 4 is a view similar to FIGURE 3 but showing the position of the component parts upon failure of one brake line.

Figure 5:
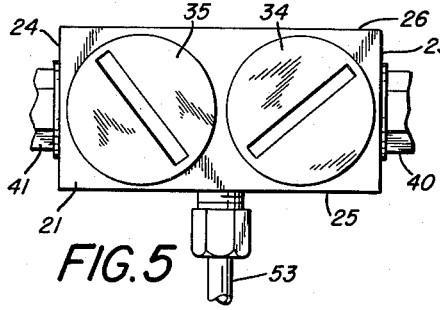
FIGURE 5 is a top plan view of the improved safety device.
Figure 6:
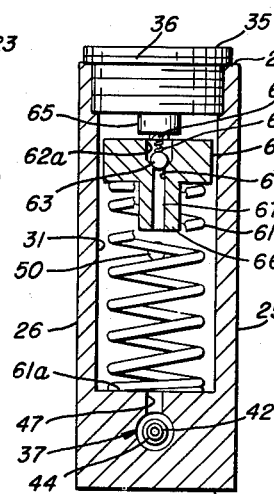
Figure 7:
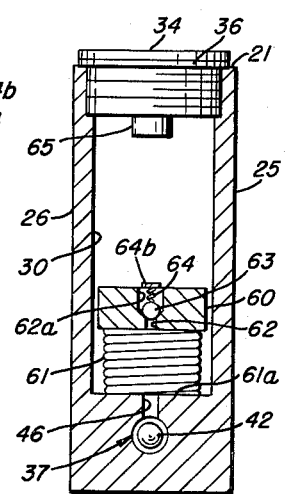

FIGURES 6 and 7 are vertical sections taken on the lines 6—6 and 7—7 of FIGURES 3 and 4 respectively.

Figure 8:
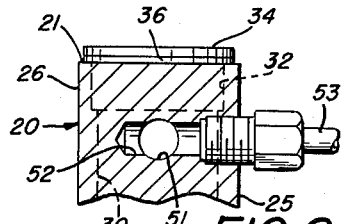

FIGURE 8 is a vertical section taken on the lines 8—8 of FIGURE 3.

FIGURES 9, 10, 12 and 13 are partial vertical sections showing modified forms of actuating pistons.

Figure 10:
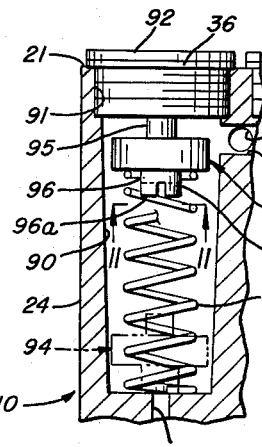
Figure 11:
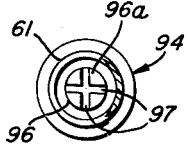

FIGURE 11 is a view taken on the lines 11—11 of FIGURE 10.

Figure 13:
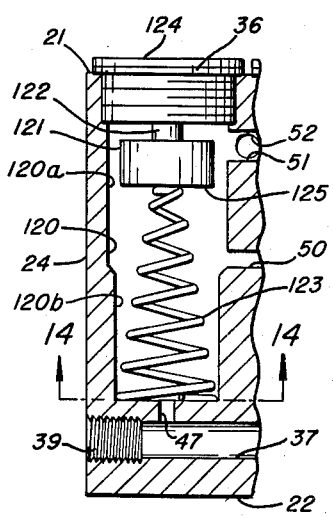
Figure 14:
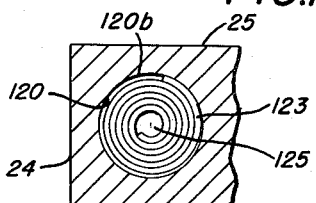

FIGURE 14 is a view taken on the lines 14—14 of FIGURE 13.

Referring now to the drawings and in particular to FIGURE 2 therefo, the improved safety device, generally designated by the numeral 10, is shown positioned in association with the hydraulic braking system of an automobile so as to prevent loss of braking fluid between the master cylinder 11 and a plurality of brake drums 12, 12 that are provided on the wheels 13, 13 and which connect master cylinder 11 with front and rear brake lines 15 and 16, respectively, with the usual foot pedal 14 being employed to actuate the master cylinder 11.

Referring now to FIGURES 3 through 8, inclusive, for a detailed description of the safety device 10, it will be seen that the same includes a rectangular block-shaped body 20 that has a top surface 21, a bottom surface 22, opposed side surfaces 23 and 24 and front and rear surfaces 25 and 26, respectively, wtih the position and location of these just described surfaces being clearly shown in the accompanying drawings.

Extending inwardly from the top surface 21 are axial bores 30 and 31 which are threaded as at 32 and 33 for the purpose of receiving closure caps 34 and 35, respectively, with the usual packing or washer 36 being provided at this just described point of juncture in each case.

In addition to the above described bores 30 and 31, the body 20 further includes an elongate bore 37 that extends between the sides 23 and 24 and which is threaded at its ends, as at 38 and 39 for the purpose of receiving fittings 40 and 41, with fitting 40 connecting, in known fashion, to line 16, while fitting 41 similarly connects to line 15 in normal fashion.

Receivable in the just described bore 37 is a valving element that is indicated generally by the numeral 42 in FIGURES 3 and 4 of the drawings, with this valving member 42 normally being centered medially of bore 37 by springs 43 and 44 and including connected balls 42a and 42b. In this fashion, the connected ball members 42a and 42b are normally spaced from the seats 40a and 41a so that the lines 15 and 16 are normally open to fluid flow as shown in FIGURE 3 of the drawings.

To the end of permitting such flow, the wall 45 of body 20 adjacent bore 37 is provided with bores 46 and 47, with bore 46 communicating bore 30 with bore 37, while bore 47 similarly communicates bore 31 with bore 37. In addition to the aforementioned structure, the dividing wall portion 49 that separates bores 30 and 31 is shown provided with a bore 50 that serves to equalize the pressure in bores 30 and 31 during the application of braking pressure. A bore 52 extending in from rear wall surface 26 connects to supply line 53 and also provides an upper opening 51 in wall 49 so that fluid from line 53 can be diverted equally into the top of bores 30 and 31. A plug 55 extends inwardly from the surface 23 for the usual purpose of drilling bores 50 and 51.

In addition to the aforementioned component parts, each bore 30 and 31 receives a piston 60 and a return spring 61, with the construction of the pistons 60, 60 and springs 61, 61 being preferably identical in the illustrated embodiment of the invention. Accordingly, each piston 60 is shown as being of preferably cylindrical configuration, with the diameter thereof being slightly less than the diameter of bore sections 30 and 31. In this manner, some clearance is provided between the piston and the wall surface of the bores. To achieve relief of back pressure, each piston is axially bored and counterbored, as at 62 and 62a, respectively, so as to receive a check valve member 63, with spring 64 preferably being employed to seat ball 63 against bore 62, while plate 64b retains the spring 64 and ball 63 in place as shown. A bumper 65 is preferably carried by each cap 34 and 35 to limit the approach of the pistons 60, 60 during return.

The piston 60 also includes a projecting sleeve 66 that has a concentric bore 67 in alignment with bores 62 and 47. Also, the bottom portion 61a of each spring is preferably formed in a spiral coil similar to the arrangement shown in connection with FIGURES 13 and 14. It is important to note that only the bottom coil is formed in this fashion and this prevents seating of the end of sleeve 66 against the bottom of either bore 30 or 31 so that there will never be a complete shut off of braking fluid, with metered amounts of flow at all times being possible.

Also and for the purposes to be subsequently described, the valving member 42 is preferably encircled by a disc 70 that is of a diameter that is substantially equal to the diameter of bore 37, with disc 70 preferably being shiftable relatively of the bores 37 in unison with valve 42.

In use or operation of the improved safety device 10, it will first be assumed that the same has its component parts assembled as shown in FIGURES 3 through 8 and has further been installed in the brake system as shown in FIGURE 2.

At this time and under normal usage, the component parts will be positioned normally as shown in FIGURE 3, with the position of each piston 60 during non-braking periods being shown in full lines, while the position of the piston during the application of braking pressure is illustrated in chain-dotted lines.

Accordingly, when braking fluid under pressure is delivered from master cylinder 11 through supply line 53, the same will enter into bore 52 and then be simultaneously diverted into the upper portions of each bore 30 and 31, with such pressure acting on the upper surface 60a of each piston to urge the same away from the top of the bore against the force of the spring 61, with this pressure also seating the ball 63 against the upper end of each bore 62. As the pistons move downwardly in the bores, the same will compress the springs 61, 61 and will simultaneously displace a volume of fluid under pressure into lines 15 and 16.

In the event of a failure in the line 16, for example, the component parts will immediately assume the position shown in FIGURE 4 of the drawings wherein the piston 60 has moved to the lowermost portion of bore 30 so as to restrict flow through bore 46. This rupture of line 16 as just described will result in a decrease in pressure to the right of ball 43a (FIGURE 4) with the result that the pressure applied through open bore 47 against ball 42b will cause the valving element 42 to move rapidly to the right of FIGURE 3 to the position of FIGURE 4 wherein the ball 42a is wedged into opening 40a to thus seal off the fitting 40. Thus, at this point, all flow through line 16 will be terminated and there will be no further loss of fluid due to the rupture that has occurred in such line.

When the rupture has been repaired, it is believed manifest that a slender, elongate pin or nail can be inserted axially into the fitting 40 to unseat the piston 42, with the result that the device will then be reuseable for the purpose above described.

However, during the time of failure and when the ball 42a is in the position of FIGURE 4, it will be noted that the wedged nature of the contact with fitting 40 will at all times retain the ball in a position of closure over opening 40a notwithstanding the pressure of spring 43 and regardless of whether or not pressure is applied to pedal 14.

It will also be noted that during the time that the brake is operating in normal condition as shown in FIGURE 3, for example, that there will always be an immediate relieving of back pressure to effectuate an automatic self-adjustment of the overall device. Specifically, in the past, it has been found that when the pistons 60, 60 are in the down condition of FIGURE 3, that there is oftentimes a tendency for the piston 60 to slowly creep upwardly. This will particularly happen if one spring 61 is stronger than the other spring 61 and in such instances, it follows that the brake fluid below the piston must, of course, be displaced around the same prior to the next braking operation. In the past, this relief has taken a relatively long time, although, in fact, the duration is normally found to be in the nature of one or two seconds. However, during such period there is an unbalance created, with the result that there will be some shifting of the valving member 42, which, in conditions of extreme use, such as taxi cabs, has been found to cause premature wear in the bore 37, for example.

However, in the improved form of the invention, when the braking pressure is released, there is an immediate relief of the piston surface by virtue of the fact that the ball 63 can immediately become unseated and permit pressure relief through the counterbore 62a. Thus, even if there is some upward travel of the pistons during prolonged application of the brakes, as at a traffic light, for example, there will be an immediate relieving of the back pressure simultaneously with the release of braking pressure so that there will be no shifting of the valving member and so that at all times there will be an equal pressure obtained.

Similarly, it will be noted that during normal operating conditions, the braking pressure applied to each line will be automatically equalized by virtue of the port 50. This situation will exist until the pistons 60, 60 have traveled downwardly to the point where the same have passed the bore 50, at which time the pressure in the bores will be separate by virtue of the fact that there is no longer any connection between the bores.

It will be seen from the foregoing that there has been provided a new and novel type of improved displacement type safety valve wherein means are provided for effectively relieving the back pressure so as to permit instantaneous equalization of internal pressure upon release of braking pressure. It has also been shown how the internal equalization of pressure insures the maintenance of equal pressures in each brake line.

Figure 9:
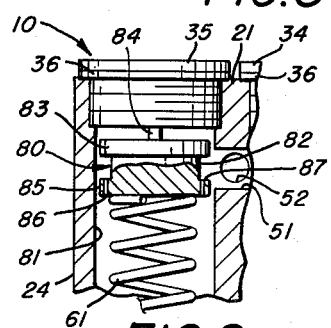

The modified form of the invention shown in FIGURE 9 of the drawings contemplates the employment of a modified piston 80 in lieu of the previously described piston 60. Accordingly, for the purpose of description, it will be understood that all remaining component parts are identical to those previously described and illustrated in connection with FIGURES 1 through 8 of the drawings.

Accordingly, and as will be noted from FIGURE 9, the piston 80 is of generally cylindrical configuration and is of a diameter such that the same is spaced slightly from the wall of bore 81, with this clearance being provided for the purpose of permitting restricted flow around the peripheral edges of piston 80. A reduced diameter portion 82 is provided at a spaced axial distance from upper face 83, with face 83 seating against pin 84 so that the undercut region 82 is disposed in adjacency with the bore 51 as shown in FIGURE 9 of the drawings.

The lower portion 85 of piston 80 is further provided with a series of apertures 86, 86 that are radially located beyond the periphery of the reduced diameter portion 82 for the purpose of relieving the piston 80. In practice, a circular course of such apertures 86, 86 is provided.

In use or operation of the modified piston 80, the functioning of the device will be as previously described but it will be noted that the openings 86, 86 operate to relieve the back pressure when it is desired to return the piston to the normal position similar to that shown in full lines in FIGURE 3 of the drawings. Additionally, the radially extending wall 87 serves as a surface against which the pressurized fluid entering through port 51 may act and it is to be understood in this regard that if desired, a series of undercuts could be provided and the apertures 86, 86 eliminated in certain instances.

With regard to the modified form of the invention shown in FIGURE 10, the same contemplates the use of tapering bores 90, 90 that are each threaded, as at 91, for reception of a cap 92, with supply bore 93 corresponding in location to bore 51 of FIGURES 1 through 8, while bores 90, 90 replace bores 30, 31 thereof.

The piston 94 that is employed in this modification is shown as being preferably of cylindrical configuration, with the diameter thereof being preferably less than the minimum diameter of each tapered bore 90, as is evidenced by the chain-dotted line position of the piston 94 in FIGURE 10 of the drawings. Again, a spacer pin 95 is provided to properly position the piston 94 with respect to the bore 93 during return thereof to normal position.

Additionally, and as shown best in FIGURE 11, the piston 94 is provided with a projecting cylindrical portion 96 preferably of reduced diameter, with end 96a thereof having channels 97, 97 provided for the purpose of metering a limited amount of fluid through opening 46 when the piston 94 is seated thereon as shown in chain dotted lines in FIGURE 10 of the drawings.

In operation, it will be noted that as the piston 94 moves upwardly of bore 90, the spacing between the same and bore 90 will progressively increase so that more and more open area is provided between the piston and bore for the purpose of progressively relieving the back pressure.

Figure 12:
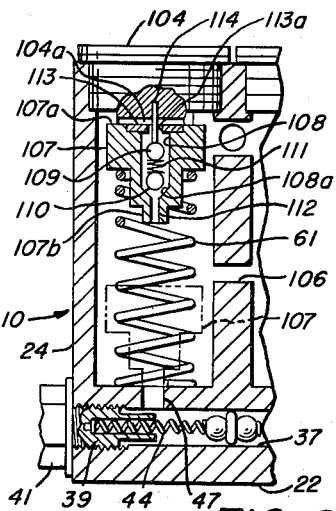

In the modified form of the invention shown in FIGURE 12 of the drawings, the safety device 10 includes a pair of bores 100 and 101, each of which further includes a threaded portion 103 within which a cap 104 may be received. A supply bore 105 and an equalizing bore 106 are provided as before, with a cross bore 37 being similarly provided in this modification of the invention. Again, and as before, a fitting 41 is received in the threaded end 39 of bore 37, with the end of fitting 41 lying beneath the opening 47 that is provided adjacent the bore 37.

The piston member 107 that is employed in this modified form of the invention is similar to that shown in connection with FIGURES 1 through 7 of the drawings, with two exceptions.

First, the main bore 108 thereof receives balls 109 and 110 with spring 111 being interposed therebetween to normally urge the balls towards the upper end of bore 108 and into contact with the seat 108a that is formed by the smaller diameter bore 112. A washer 113 is provided in a recess on the top surface 107a of the piston 107 in concentricity with bore 108 so as to have its opening 113a provide a seat for ball 109, with the washer 113 preferably being staked in place as was previously described. A pin 114 projects axially from the lower surface of the cap 104 and is located so as to pass through the opening 113a of the washer during the upward movement thereof. In this fashion, as the piston 107 moves upwardly in the bore, the projecting pin 114 will engage the ball 109 and will unseat the same from the opening 113a to permit fluid to be relieved through the opening 113a. Fluid so escaping will pass through passages or channels 104a, 104a provided on the underface of cap 104.

While this modified form of the invention shows the use of a pin 114 that is carried by the cap 104, it is to be understood that a piston or rivet type of pin could have its shank loosely passed through the opining 113 and its head retained within the bore 108. In this fashion, the ball 109 could be eliminated, with the head of the pin serving as a piston head that would seat and unseat with respect to opening 113a upon contact with cap 104. Similarly, while grooves 104a, 104a are shown provided on the bottom face of the cap 104, it is to be understood that equal results could be obtained by providing such channels on the top surface 107a of piston 107.

The second feature of the invention contemplates provision of means for preventing seating of piston 107 against the bottom of bore 100 and, accordingly, the lower portion 107b of piston 107 is intended to pass through opening 47 and engage the fitting 39 so that downward movement of the piston 107 will be limited by such contact.

In use or operation of the device, the downward movement of the piston 107 in the bore to the chain dotted line position is limited by the contact between portion 107b and fitting 39. Conversely, during upward movement of the piston, the ball 109 will ultimately be unseated upon being struck by pin 114 so that relieving of the back pressure can occur only when the piston 107 is in close proximity to the cap 104. In this way, during the time when the piston is in its down position (shown in chain dotted lines) a restricted amount of flow may occur, while in the up position of full lines provision is made for adequately relieving the back pressure.

The modified form of the invention shown in FIGURES 13 and 14 of the drawings contemplates the use of a stepped bore 120 having concentric upper and lower bore sections 120a and 120b within which a cylindrical piston 121 is reciprocal as indicated in FIGURE 13, with the piston 121 normally being urged against a stop 122 by spring 123, with the stop 122 being carried by a cap 124, while spring 123 seats against the bottom 125 of bore 120, as shown in FIGURE 13. The piston 121, while being of generally cylindrical configuration and having a diameter slightly smaller than the diameter of bore section 120b, has a diameter considerably less than the diameter of bore section 120a and in this manner, when the piston 121 moves upwardly in bore 120 during prolonged braking, the increased volume between piston and bore will immediately relieve the back pressure and permit proper displacement.

Also, the coil spring 123 is shown disposed over the bore 47 so as to prevent complete seating of piston 121 against bottom wall 125. Further, this spring 123 preferably decreases in radial dimension throughout its axial extent so as to have the coils thereof capable of collapsing within each other as indicated best in FIGURE 14 of the drawings.

It will be seen from the foregoing that there has been provided a new and improved type of safety brake device, with provision being made in all instances for the relieving of back pressure that exists following release of the pedal after a braking operation.

It has been shown how this relieving of the back pressure permits a more sensitive type of control device to be employed and further how the provision of a connecting bore between the dual chambers permits the maintaining of an equalized pressure between brake lines at all times.

It will also be noted how all forms of the invention have featured construction wherein the piston employed is prevented from completely sealing off flow through either the bore 46 or 47. This safety feature is believed important because of the fact that the same always insures a limited amount of flow, regardless of whether or not there has been failure in one line. If such precautions were not taken, it is possible that the driver, after a rupture, would have a hard brake pedal but would, in actual fact, be unable to deliver braking fluid for pressurizing the unruptured line.

While a full and complete description of the invention has been set forth in accordance with the dictates of the Patent Statutes, it is to be understood that the invention is no intended to be so limited.

Accordingly, where appropriate, modifications of the invention may be resorted to without departing from the spirit hereof or the scope of the appended claims.

This application is a continuation-in-part of Applicant's copending application Serial Number 633,245, filed January 9, 1957, and now U.S. Patent 2,902,043.

What is claimed is:

1. A safety device for controlling hydraulic flow between the master cylinder and front and rear brake lines of an automobile, comprising; a housing having an axial bore therethrough defining outlet ports that communicate with said front and rear brake lines; a pair of elongate fluid reservoirs, each having an axial length and each communicating at one axial end thereof with said bore at axially spaced points therein; an inlet port defined by said housing and being connected to said master cylinder; conduit means connecting said inlet port with the remaining axial ends of said reservoirs; a pair of pistons respectively received in said reservoirs and being shiftable axially thereof in response to pressure from said master cylinder; a valve element balanced medianly of said bore and being shiftable into seating engagement with either of said outlet ports to terminate flow therethrough upon failure of the brake line associated therewith; and an equalizing port interconnecting said reservoirs at a point intermediate the axial ends thereof.

2. A safety device for controlling hydraulic flow between the master cylinder and front and rear brake lines of an automobile, comprising; a housing having an axial bore therethrough defining outlet ports that communicate with said front and rear brake lines; a pair of elongate fluid reservoirs, each having an axial length and each communicating at one axial end thereof with said bore at axially spaced points therein; an inlet port defined by said housing and being connected to said master cylinder; conduit means connecting said inlet port with the remaining axial ends of said reservoirs; a pair of pistons respectively received in said reservoirs and being shiftable axially thereof in response to pressure from said master cylinder; a valve element balanced medianly of said bore and being shiftable into seating engagement with either of said outlet ports to terminate flow therethrough upon failure of the brake line associated therewith; and means for permitting greater flow past said pistons during movement towards said inlet port than occurs during movement of said pistons towards said bore.

3. A safety device for controlling hydraulic flow between the master cylinder and front and rear brake lines of an automobile, comprising; a housing having an axial bore therethrough defining outlet ports that communicate with said front and rear brake lines; a pair of elongate fluid reservoirs, each connected at one end to said bore at axially spaced points; an inlet port defined by said housing and connecting said master cylinder with the opposed ends of said reservoirs; a pair of pistons respectively received in said reservoirs and being shiftable therein in response to pressure from said master cylinder; a valve element balanced medianly of said bore and being shiftable into seating engagement with either of said outlet ports to terminate flow therethrough upon failure of the brake line associated therewith; an equalizing port interconnecting said reservoirs at a point intermediate the axial ends thereof; and means for permitting greater flow past said pistons during movement towards said inlet port than occurs during movement of said pistons towards said bore.

4. A safety device for controlling hydraulic flow between the master cylinder and front and rear brake lines of an automobile, comprising; a housing having an axial bore therethrough defining outlet ports that communicate with said front and rear brake lines; a pair of elongate fluid reservoirs, each having an axial length and each communicating at one axial end thereof with said bore at axially spaced points therein; an inlet port defined by said housing and being connected to said master cylinder; conduit means connecting said inlet port with the remaining axial ends of said reservoirs; a pair of pistons respectively received in said reservoirs and being shiftable axially thereof in response to pressure from said master cylinder; a valve element balanced medianly of said bore and being shiftable into seating engagement with either of said outlet ports to terminate flow therethrough upon failure of the brake line associated therewith; and means for permitting return of at least one said piston towards said inlet port during the period that braking pressure is applied from said master cylinder.

5. A safety device for controlling hydraulic flow between the master cylinder and front and rear brake lines of an automobile, comprising; a housing having an axial bore therethrough defining outlet ports that communicate with said front and rear brake lines; a pair of elongate fluid reservoirs, each having an axial length and each communicating at one axial end thereof with said bore at axially spaced points therein; an inlet port defined by said housing and being connected to said master cylinder; conduit means connecting said inlet port with the remaining axial ends of said reservoirs; a pair of pistons respectively reecived in said reservoir and being shiftable axially thereof in response to pressure from said master cylinder; a valve element balanced medianly of said bore and being shiftable into seating engagement with either of said outlet ports to terminate flow therethrough upon failure of the brake line associated therewith; each said piston having opposed inlet and outlet sides adapted to react to pressure emitting respectively from said inlet and outlet ports; and means for displacing brake fluid from the outlet side of said piston to the inlet side thereof during continuous application of braking pressure from said master cylinder.

6. The device of claim 5 further characterized by the fact that said means include stepped wall surfaces defined by each said reservoir; said stepped wall surface including a first cylindrical surface extending from the point of connection with said bore and a second cylindrical surface of larger diameter extending from the point of connection with said conduit means.

7. The device of claim 5 further characterized by the fact that at least one said piston is circular and includes an annular undercut intermediate axial ends thereof.

8. The device of claim 7 further characterized by the fact that said undercut defines a flange; said flange having axial bores extending therethrough adjacent the peripheral edge.

9. The device of claim 5 further characterized by the fact that said reservoirs include tapering cylindrical walls that have a minimal diameter adjacent their point of connection with said bore and a maximum diameter adpacent their point of connection with said conduit means.

10. The device of claim 5 further characterized by the fact that said piston is of cylindrical configuration and includes an axially projecting stem; the projecting end of said stem being undercut to provide passages when said stem is seated against the end of said reservoir.

11. The device of claim 5 further characterized by the presence of sealing means carried by said valve member intermediate its axial ends and engaging said bore, whereby said bore is divided into subchambers.

12. The device of claim 5 further characterized by the fact that said means include a control bore provided in at least one said piston, with said bore having axially spaced valve seats; a pair of valving elements positioned in said control bore; spring means normally urging said valving members apart towards seating engagement with said valve seats; and means for unseating one said valving element from its valve seat during upward movement of said piston in said reservoir.

13. The device of claim 5 further characterized by the fact that said means include a control bore provided in at least one said piston with said bore having axially spaced valve seats; a pair of valving elements positioned in said control bore; spring means normally urging said valving members apart towards seating engagement with said valve seats; and means for unseating both said valving elements from the valve seats during upward movement of said piston in said reservoir.

References Cited in the file of this patent

UNITED STATES PATENTS

| | | |
|---|---|---|
| 1,986,763 | Rhodes | Jan. 1, 1935 |
| 2,058,595 | Klein | Oct. 27, 1936 |
| 2,152,345 | Bowen | Mar. 28, 1939 |
| 2,285,703 | Foster | June 9, 1942 |
| 2,369,313 | Rasmussen | Feb. 13, 1945 |
| 2,563,168 | Herriott | Aug. 7, 1951 |
| 2,854,016 | Margida | Sept. 30, 1958 |
| 2,879,791 | Hollmann | Mar. 31, 1959 |
| 2,902,043 | Margida | Sept. 1, 1959 |